United States Patent
Reddy

(10) Patent No.: US 9,535,918 B1
(45) Date of Patent: Jan. 3, 2017

(54) DYNAMICALLY MAPPING ZONES

(71) Applicant: International Business Machines Corporation, Armonk, NY (US)

(72) Inventor: Dandala Vinod Reddy, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/969,384

(22) Filed: Dec. 15, 2015

(51) Int. Cl.
*G06F 17/00* (2006.01)
*G06F 17/30* (2006.01)

(52) U.S. Cl.
CPC ... *G06F 17/30106* (2013.01); *G06F 17/30091* (2013.01); *G06F 17/30203* (2013.01)

(58) Field of Classification Search
CPC .............. G06F 17/30; G06F 17/30106; G06F 17/30091
USPC ................................. 707/600–899
See application file for complete search history.

(56) References Cited

U.S. PATENT DOCUMENTS

| | | | |
|---|---|---|---|
| 5,418,864 | A | 5/1995 | Murdock et al. |
| 8,908,969 | B2 | 12/2014 | Zuev et al. |
| 2004/0143574 | A1* | 7/2004 | Nakamura ........ G06F 17/30619 |
| 2005/0289182 | A1 | 12/2005 | Pandian et al. |
| 2009/0271700 | A1 | 10/2009 | Chen et al. |

OTHER PUBLICATIONS

IBM, "Datacap", IBM Datacap, Version 9.0, [online], [Retrieved on Oct. 1, 2015]. Retrieved from the Internet at <URL: http://www-01.ibm.com/support/knowledgecenter/SSZRWV_9.0.0/com.ibm.dc.install.doc/dcpov007.htm? ang=en>, © Copyright IBM Corporation 2015, Total 2 pp.

Mell, P. and T. Grange, "The NIST Definition of Cloud Computing (Draft)", Sep. 2011, Computer Security Division Information Technology Laboratory National Institute of Standards and Technology, Total 7 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Wikipedia, "Natural Language Processing", [online], [Retrieved on Oct. 1, 2015]. Retrieved from the Internet at <URL: https://en.wikipedia.org/wiki/Natural_language_processing>, page last modified Sep. 5, 2015, Total 5 pp.

Zettlemoyer, L., "Relation Extraction", Winter 2013, retrieved from the Internet at <URL: http://courses.cs.washington.edu/courses/cse517/13wi/slides/cse517wi13-RelationExtraction.pdf>, Total 27 pp.

* cited by examiner

*Primary Examiner* — Isaac M Woo
(74) *Attorney, Agent, or Firm* — Janaki K. Davda; Konrad, Raynes, Davda & Victor LLP

(57) ABSTRACT

Provided are techniques for dynamically mapping zones. For a file and a field, while receiving text characters, possible terms for the text characters are provided by querying an index. In response to receiving selection of a possible term from the possible terms, each occurrence and position of the selected term in the file is determined. In response to selection of an occurrence and position of the selected term, the file is marked to identify the selected occurrence at the position in the file. The selected term and the position are associated with the field for any other files that match a type of the file.

18 Claims, 20 Drawing Sheets

Image1.txt:

INVOICE
INVOICE # 70002
FROM
Busy Car Repair DATE: 02 /26 /09
100 Auto Road
Salt Lake City, UT 84101
Phone: (801) 555-1234
TO Brilliant Repair Shop SHIP Brilliant Repair Shop
90 Fixed Street 90 Fixed Street
Carson City, NV 89701 TO Carson City, NV 89701
Phone: (775) 555-6789 Phone: (775) 555-6789
salesperson PO shipping method shipping terms salesperson payment terms due date
191 788914 2/10 Net 30 03/26/09
qty item # description unit price discount line total
6 201 Trucking - Ticket 138423 65.00 390.00
19 206 KCL 6.00 114.00
130 203 Fresh Water .25 32.50
Total
Discount
Subtotal 536.50
Sales Tax 42.92
TOTAL 579.42
Make all checks payable to BCR
THANK YOU FOR YOUR BUSINESS!

FIG. 2

Image1. XML

```
<L l="226" t="475" b="537" r="2277" i="3"><W l="226" t="475" r="373" b="530" x="1" y="2">Busy</W>
         <W l="392" t="475" r="498" b="517" x="2" y="2">Car</W>
         <W l="518" t="475" r="715" b="528" x="3" y="2">Repair</W>
         <W l="2045" t="512" r="2131" b="537" x="1" y="7">DATE:</W>
         <W l="2152" t="512" r="2175" b="537" x="2" y="7">02</W>
         <W l="2182" t="512" r="2226" b="537" x="3" y="7">/26</W>
         <W l="2233" t="512" r="2277" b="537" x="4" y="7">/09</W>
</L>

<L l="223" t="815" b="870" r="2111" i="7"><W l="223" t="826" r="358" b="870" x="1" y="8">TO</W>
         <W l="463" t="816" r="597" b="846" x="2" y="8">Brilliant</W>
         <W l="612" t="816" r="732" b="853" x="3" y="8">Repair</W>
         <W l="745" t="815" r="838" b="853" x="4" y="8">Shop</W>
         <W l="1337" t="826" r="1627" b="870" x="5" y="8">SHIP</W>
         <W l="1736" t="816" r="1868" b="846" x="6" y="8">Brilliant</W>
         <W l="1883" t="816" r="2003" b="853" x="7" y="8">Repair</W>
         <W l="2017" t="815" r="2111" b="853" x="8" y="8">Shop</W>
</L>

<L l="228" t="596" b="627" r="497" i="4"><W l="228" t="596" r="292" b="627" x="1" y="3">100</W>
         <W l="303" t="596" r="387" b="627" x="2" y="3">Auto</W>
         <W l="403" t="596" r="497" b="627" x="3" y="3">Road</W>
</L>

<L l="227" t="653" b="693" r="677" i="5"><W l="227" t="653" r="297" b="685" x="1" y="4">Salt</W>
         <W l="311" t="655" r="397" b="685" x="2" y="4">Lake</W>
         <W l="412" t="653" r="487" b="693" x="3" y="4">City,</W>
         <W l="505" t="655" r="557" b="685" x="4" y="4">UT</W>
         <W l="570" t="655" r="677" b="685" x="5" y="4">84101</W>
</L>
```

FIG. 3A

```
<L l="227" t="712" b="752" r="652" i="6"><W l="227" t="712" r="352" b="743" x="1"
y="5">Phone:</W>
          <W l="371" t="712" r="465" b="752" x="2" y="5">(801)</W>
          <W l="480" t="712" r="652" b="743" x="3" y="5">555-1234</W>
</L>

<L l="1891" t="2485" b="2508" r="2252" i="20"><W l="1891" t="2485" r="1968"
b="2508" x="1" y="48">Sales</W>
          <W l="1977" t="2485" r="2027" b="2508" x="2" y="48">Tax</W>
          <W l="2173" t="2485" r="2252" b="2508" x="3" y="48">42.92</W>
     </L>

<L l="1927" t="2563" b="2587" r="2252" i="21"><W l="1927" t="2563" r="2027"
b="2587" x="1" y="49">TOTAL</W>
          <W l="2157" t="2563" r="2252" b="2587" x="2" y="49">579.42</W>
</L>
```

FIG. 3B

Busy Car Repair

INVOICE

100 Auto Road
Salt Lake City, UT 84101
Phone: (801) 555-1234

INVOICE # 70002
DATE: 02/26/09

| T O | Brilliant Repair Shop<br>90 Fixed Street<br>Carson City, NV 89701<br>Phone: (775) 555-6789 | S H I P<br>T O | Brilliant Repair Shop<br>90 Fixed Street<br>Carson City, NV 89701<br>Phone: (775) 555-6789 |
|---|---|---|---|

| salesperson | PO | shipping method | shipping terms | salesperson | payment terms | due date |
|---|---|---|---|---|---|---|
| 191 | 788914 | | | | 2/10 Net 30 | 03/26/09 |

| qty | item # | description | unit price | discount | line total |
|---|---|---|---|---|---|
| 6 | 201 | Trucking - Ticket 138423 | 65.00 | | 390.00 |
| 19 | 206 | KCL | 6.00 | | 114.00 |
| 130 | 203 | Fresh Water | .25 | | 32.50 |

Total Discount

Subtotal 536.50
Sales Tax 42.92
TOTAL 579.42

Make all checks payable to BCR
THANK YOU FOR YOUR BUSINESS!

— 400

Receiver
Br
Brilliant <463,816,597,846>  — 422
Brilliant <1736,816,1868,846>  — 424

Receiver
Br
Brilliant <463,816,597,846>
Brilliant <1736,816,1868,846>

— 410
— 420
— 422
— 424
— 400

Busy Car Repair           INVOICE
100 Auto Road                                    INVOICE # 70002
Salt Lake City, UT 84101                         DATE: 02/26/09
Phone: (801) 555-1234

T O   Brilliant Repair Shop    S H I P   [Brilliant] Repair Shop — 600
      90 Fixed Street                  T O   90 Fixed Street
      Carson City, NV 89701                  Carson City, NV 89701
      Phone: (775) 555-6789                  Phone: (775) 555-6789

| salesperson | PO | shipping method | shipping terms | salesperson | payment terms | due date |
|---|---|---|---|---|---|---|
| 191 | 788914 | | | | 2/10 Net 30 | 03/26/09 |

| qty | item # | description | unit price | discount | line total |
|---|---|---|---|---|---|
| 6 | 201 | Trucking - Ticket 138423 | 65.00 | | 390.00 |
| 19 | 206 | KCL | 6.00 | | 114.00 |
| 130 | 203 | Fresh Water | .25 | | 32.50 |

Total Discount

Subtotal    536.50
Sales Tax    42.92
TOTAL      579.42

Make all checks payable to BCR
THANK YOU FOR YOUR BUSINESS!

— 400

Busy Car Repair INVOICE

INVOICE # 70002
DATE: 02/26/09

100 Auto Road
Salt Lake City, UT 84101
Phone: (801) 555-1234

600

T O  Brilliant Repair Shop          S H I P  Brilliant Repair Shop
      90 Fixed Street                            90 Fixed Street
      Carson City, NV 89701        T O   Carson City, NV 89701
      Phone: (775) 555-6789                 Phone: (775) 555-6789

| salesperson | PO | shipping method | shipping terms | salesperson | payment terms | due date |
|---|---|---|---|---|---|---|
| 191 | 788914 | | | | 2/10 Net 30 | 03/26/09 |

| qty | item # | description | unit price | discount | line total |
|---|---|---|---|---|---|
| 6 | 201 | Trucking - Ticket 138423 | 65.00 | | 390.00 |
| 19 | 206 | KCL | 6.00 | | 114.00 |
| 130 | 203 | Fresh Water | .25 | | 32.50 |

Total Discount

Subtotal  536.50
Sales Tax  42.92
TOTAL  579.42

Make all checks payable to BCR
THANK YOU FOR YOUR BUSINESS!

Receiver
| Brilliant |  — 700

FIG. 7

INVOICE

Busy Car Repair
100 Auto Road
Salt Lake City, UT 84101
Phone: (801) 555-1234

INVOICE # 70002
DATE: 02/26/09

T O Brilliant Repair Shop
90 Fixed Street
Carson City, NV 89701
Phone: (775) 555-6789

S H I P  T O Brilliant Repair Shop
90 Fixed Street
Carson City, NV 89701
Phone: (775) 555-6789

| salesperson | PO | shipping method | shipping terms | salesperson | payment terms | due date |
|---|---|---|---|---|---|---|
| 191 | 788914 | | | | 2/10 Net 30 | 03/26/09 |

| qty | item # | description | unit price | discount | line total |
|---|---|---|---|---|---|
| 6 | 201 | Trucking - Ticket 138423 | 65.00 | | 390.00 |
| 19 | 206 | KCL | 6.00 | | 114.00 |
| 130 | 203 | Fresh Water | .25 | | 32.50 |

Total Discount

Subtotal 536.50
Sales Tax 42.92
TOTAL 579.42

Make all checks payable to BCR
THANK YOU FOR YOUR BUSINESS!

---

Receiver State
None ▼
UT <g,h,i,j>
NV <g1,h1,i1,j1>
NV <g2,h2,i2,j2>

Receiver City
None ▼
Carson City <x,y,z,r>
Carson City <x1,y1,z1,r1>
Salt Lake City <t,u,v,w>

Receiver Phone No.
None ▼
(775) 555-6789 <a1,b1,c1,d1>
(775) 555-6789 <a2,b2,c2,d2>
(801) 555-1234 <a3,b3,c3,d3>

FIG. 8

INVOICE

Busy Car Repair

INVOICE # 70002
DATE: 02 /26 /09

100 Auto Road
Salt Lake City, UT 84101
Phone: (801) 555-1234

T O  Brilliant Repair Shop
  90 Fixed Street
902 — Carson City, NV 89701
  Phone: (775) 555-6789
        906

904

S H I P  Brilliant Repair Shop
  90 Fixed Street
T O  Carson City, NV 89701
  Phone: (775) 555-6789

| salesperson | PO | shipping method | shipping terms | salesperson | payment terms | due date |
|---|---|---|---|---|---|---|
| 191 | 788914 | | | | 2/10 Net 30 | 03/26/09 |

| qty | item # | description | unit price | discount | line total |
|---|---|---|---|---|---|
| 6 | 201 | Trucking - Ticket 138423 | 65.00 | | 390.00 |
| 19 | 206 | KCL | 6.00 | | 114.00 |
| 130 | 203 | Fresh Water | .25 | | 32.50 |

Total Discount

Subtotal 536.50
Sales Tax 42.92
TOTAL 579.42

Make all checks payable to BCR
THANK YOU FOR YOUR BUSINESS!

400

Receiver State
None ▼
UT <g,h,i,j>
NV <g1,h1,i1,j1>
NV <g2,h2,i2,j2>

800

Receiver City
None ▼
Carson City <x,y,z,r>
Carson City <x1,y1,z1,r1>
Salt Lake City <t,u,v,w>

810

Receiver Phone No.
None ▼
(775) 555-6789 <a1,b1,c1,d1>
(775) 555-6789 <a2,b2,c2,d2>
(801) 555-1234 <a3,b3,c3,d3>

Receiver State
NV
400
1000

Receiver City
Carson City
1010

Receiver Phone No.
(775) 555-6789
1020

INVOICE

Busy Car Repair

INVOICE # 70002
DATE: 02 /26 /09

100 Auto Road
Salt Lake City, UT 84101
Phone: (801) 555-1234

T O  Brilliant Repair Shop
90 Fixed Street
Carson City NV 89701
Phone: (775) 555-6789

S H I P  T O  Brilliant Repair Shop
90 Fixed Street
Carson City, NV 89701
Phone: (775) 555-6789

| salesperson | PO | shipping method | shipping terms | salesperson | payment terms | due date |
|---|---|---|---|---|---|---|
| 191 | 788914 | | | | 2/10 Net 30 | 03/26/09 |

| qty | item # | description | unit price | discount | line total |
|---|---|---|---|---|---|
| 6 | 201 | Trucking - Ticket 138423 | 65.00 | | 390.00 |
| 19 | 206 | KCL | 6.00 | | 114.00 |
| 130 | 203 | Fresh Water | .25 | | 32.50 |

Total Discount

Subtotal  536.50
Sales Tax  42.92
TOTAL  579.42

Make all checks payable to BCR
THANK YOU FOR YOUR BUSINESS!

FIG. 10

Notes:

"Mr. Vinod Reddy is the claimant who is involved in the accident that happened on Sep 21, 2015. He has been riding with Mrs. Anne Reddy, his wife, sitting in the passenger seat. He was driving a red car, which has been damaged on the rear bumper. The claimant case has been approved and $1000 has been released to the body shop, BodyFixing Shop Inc, who is working on repairing the claimant's vehicle."

FIG. 11

DYNAMICALLY MAPPING ZONES

FIELD

Embodiments of the invention relate to dynamically mapping zones. In particular, embodiments relate to dynamically zoning extracted text and mapping the extracted text to fields with a file capture and extraction solution incorporating search and analytics technology related techniques. A document capture and extraction solution is a type of file capture and extraction solution.

BACKGROUND

As part of a document capture and extraction solution, a user scans a hard copy of a page or document to generate a digital copy (or image) and profiles the page or document to recognize and extract the text and its specific zones from that page. Zones may be described as locations (e.g., based on x, y coordinates).

In an enterprise company, for example, that works in an insurance domain, a user may create fields to be mapped to specific zones of a page, so that, in future if a similar insurance document comes in, the document capture and extraction solution automatically identifies the text from the mapped zone and assigns that text to the field.

However, when a specific type of document is scanned and profiled for the first time, the document capture and extraction solution requires an operator to manually create these zones for a specific page/document and map the zones to their specific fields.

Currently the document capture and extraction solution allows users to recognize and extract text and its positions from a digital or hard copy of a page or document using Optical Character Recognition (OCR) and Intelligent Character Recognition (ICR) technologies. However, in order to zone and map the fields, a user has to 1) manually draw a box around the text to record or register that text and its zones and 2) map the zones to a specific field assigned to that document or page.

The current document capture and extraction solution is manual intensive, since a user has to use the user interface feature of drag to create zones accurately. In most cases, the document image shown is not easily visible, and the user has to switch back and forth, zooming the images to get a clear view of text. Most of the time, this tends to be error prone. This also depends on the ability of the user to identify different color gradings efficiently and being able to handle mouse movements and positioning over an image effortlessly. That is, the current document capture and extraction solution requires drawing zones around the text identified in the documents/images, which will draw a red or blue box/zone around the text. As there are more and more zones drawn close to each other, it is difficult for some end users to identify the boundaries of different boxes/zones.

SUMMARY

Provided is a method for dynamically mapping zones. The method comprises, for a file and a field, while receiving text characters, providing, with a processor of a computer, possible terms for the text characters by querying an index; and, in response to receiving selection of a possible term from the possible terms, determining each occurrence and position of the selected term in the file; in response to selection of an occurrence and position of the selected term, marking the file to identify the selected occurrence at the position in the file; and associating the selected term and the position with the field for any other files that match a type of the file.

Provided is a computer program product for dynamically mapping zones. The computer program product comprising a computer readable storage medium having program code embodied therewith, the program code executable by at least one processor to perform: for a file and a field, while receiving text characters, providing possible terms for the text characters by querying an index; and, in response to receiving selection of a possible term from the possible terms, determining each occurrence and position of the selected term in the file; in response to selection of an occurrence and position of the selected term, marking the file to identify the selected occurrence at the position in the file; and associating the selected term and the position with the field for any other files that match a type of the file.

Provided is a computer system for dynamically mapping zones. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations of: for a file and a field, while receiving text characters, providing possible terms for the text characters by querying an index; and, in response to receiving selection of a possible term from the possible terms, determining each occurrence and position of the selected term in the file; in response to selection of an occurrence and position of the selected term, marking the file to identify the selected occurrence at the position in the file; and associating the selected term and the position with the field for any other files that match a type of the file.

BRIEF DESCRIPTION OF THE SEVERAL VIEWS OF THE DRAWINGS

Referring now to the drawings in which like reference numbers represent corresponding parts throughout:

FIG. 2. illustrates an example extracted text file output by a file capture and extraction engine in accordance with certain embodiments.

FIGS. 3A and 3B illustrate an example boundaries file output by a file capture and extraction engine in accordance with certain embodiments.

FIG. 4 illustrates a user interface for displaying suggestions in accordance with certain embodiments.

FIG. 6 illustrates a user interface in response to a second suggestion being selected in accordance with certain embodiments.

FIG. 7 illustrates a user interface in response to a suggestion being selected for mapping in accordance with certain embodiments.

FIG. 8 illustrates a user interface with a first selection of a receiver state, a receiver city, and a receiver phone number in accordance with certain embodiments.

FIG. 9 illustrates a user interface with a second selection of a receiver state, a receiver city, and a receiver phone number in accordance with certain embodiments.

FIG. 10 illustrates a user interface with a second selection of a receiver state, a receiver city, and a receiver phone number and with zone mapping in accordance with certain embodiments.

FIG. 11 illustrates an example notes portion of a report in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
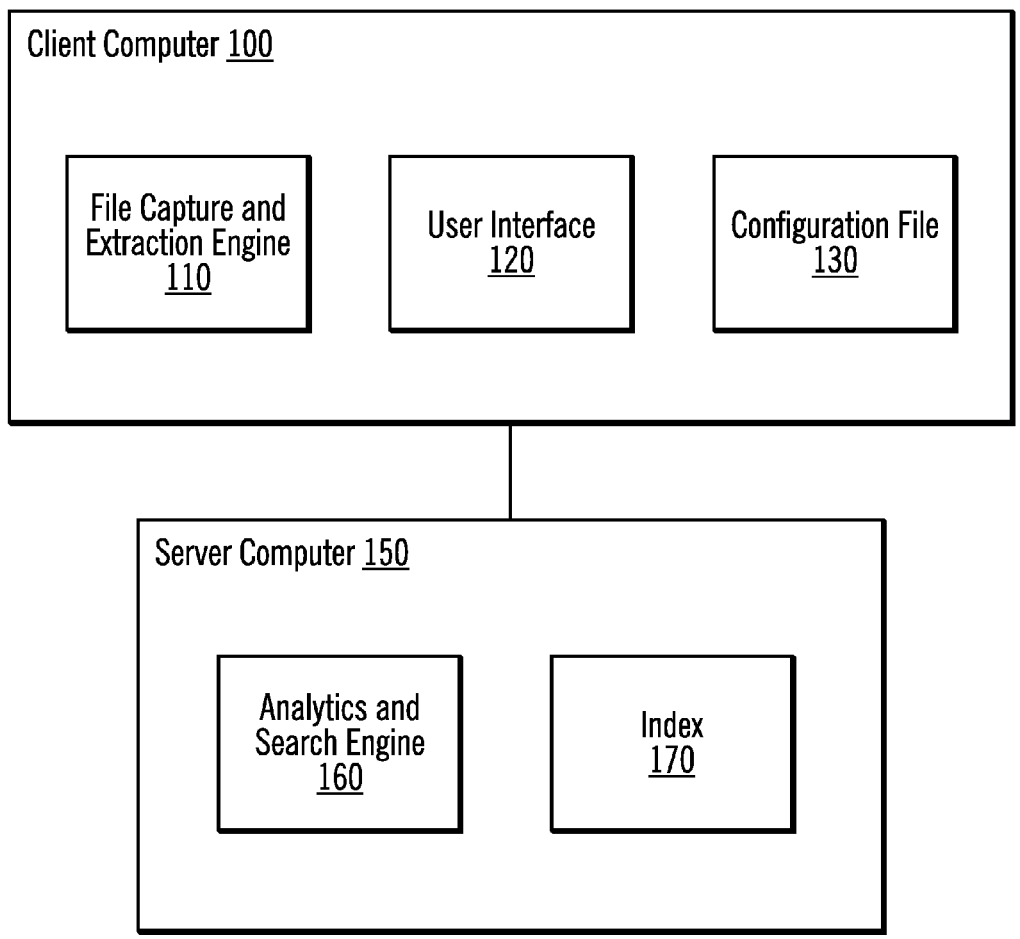
FIG. 1 illustrates, in a block diagram, a computing environment in accordance with certain embodiments.

FIG. 1 illustrates, in a block diagram, a computing environment in accordance with certain embodiments. A client computer 100 is coupled to a server computer 150. The client computer 100 includes a file capture and extraction engine 110, a user interface 120, and a configuration file 130. The server computer 150 includes a search and analytics engine 160 and an index 170. Embodiments integrate searching and analysis with the search and analytics engine 160. The file capture and extraction engine 110 processes files, such as documents, images, and other types of files.

Embodiments introduce the search and analytics engine 160 to index extracted data from pages of files (e.g., pages of documents) and to make use of type-ahead suggestions, integrating with the text and zone extraction technologies of OCR and ICR, to list the available text occurrences in a particular page and associate each occurrence with its relative zone (or location or position) within that page. As a user (e.g., operator) types in a series of characters (e.g., alphabetic characters, numbers and/or symbols (such as "#", "/", etc.)) to match a term (e.g., a word or date) available or valid specific to the page the user is working on into a field, the user interface 120 displays a list box that provides a list of type-ahead suggestions related to the terms that are part of that page and that start with the typed characters, where that field correlates with ICR/OCR extracted data, to dynamically identify the zones of that specific term and highlight (e.g., with a box) the matching terms on that page. Then, as the user decides on the specific text to be mapped to a specific field, the zone details for that specific text is recorded/drawn and registered as a mapping to that field by the user interface 120.

Merely to enhance understanding, examples are provided herein, but embodiments are not intended to be limited to such examples.

For example, invoices are generated by a company in the form of paper or electronic document. A file capture and extraction engine 110 is used to scan a document and profile the document to extract all the data using OCR and ICR. This results in 1) an extracted text file, which contains the data extracted from the scanned document, and 2) a boundaries file, which contains the details of the text encompassed with line and term boundaries (e.g., positions (left, right, top, bottom) of the specific terms in the document). For examples herein, the extracted text file is named Image1.txt, and the boundaries file is an Extensible markup Language (XML) file named Image1.XML.

With embodiments, the analytics and search engine 160 crawls and indexes the file system data (e.g., documents, images, text files having .txt extensions, etc.). A document may be stored in the index as follows: the data from the document is stored as tokens and a summary, which may be referenced by the document that the data is from. For example, there are two documents in the index image1.txt (which has terms "patent" "file") and image2.txt (which has terms "patent" and "review"). As the analytics and search engine 160 reads and indexes these two documents, the user may use a query such as {docid: image1.txt AND patent} to get a reference and a unique handle to image1.txt.

FIG. 2. illustrates an example text file 200 output by a file capture and extraction engine 110 in accordance with certain embodiments. In particular, FIG. 2 illustrates the extracted text file Image1.txt. FIGS. 3A and 3B illustrate an example boundaries file 300 output by a file capture and extraction enginefile capture and extraction engine 110 in accordance with certain embodiments. In particular, FIGS. 3A and 3B illustrate the boundaries file Image1.XML.

Embodiments integrate searching and analysis to form the search and analytics engine 160 to enable crawling the index 170 of the data from the text file. Once in the index 170, the search and analytics engine 160 enables the type-ahead feature by querying the index 170 to provide one or more matching terms from the index 170 that belong to the document. With embodiments, the search and analytics engine 160 narrows down the query to a document identifier (doc id) that is being processed to map zones to fields dynamically.

Continuing with this example, an administrator defines a field "Receiver", which refers to a company or a person to acknowledge and process the invoice. Then, as the user scans and profiles a document, the search and analytics engine 160 monitors the repository or file system where the new incoming data is extracted and stored and defines a rule or mechanism in the background by which the profiler, after it is done with the extraction of the data and the positions of the data, will ping the search and analytics engine 160 to wake up and crawl and index the newly generated files. So, as the user, for the first time tries to map the zones from a document to the "Receiver" field, by typing in partial text related to a term available in the image, the different occurrences of the terms that match the entered partial text are shown in the list box 420. Similarly, the user may define different fields "Sender", "City", etc. and apply the same concept to implement the dynamic zoning mapping. For this example, the user types in the beginning of the term in "Receiver" field as "Bri", then the search and analytics engine 160, under the cover, queries the index 170 for type-ahead suggestions that match the query "any text beginning with "Br" and matching "doc id: Image1.txt", which returns "Brilliant" as query response. The following is an example single term query and response:

Query: any term starting with "Br" and part of the Doc Id: Image1.txt Response: "Brilliant"

Then, the search and analytics engine 160 uses the response "Brilliant" as input to look up the respective zone positions from the boundaries file Image1.XML, which will result in narrowing down to two occurrences in the document with positions of:

<W l="463" t="816" r="597" b="846" x="2" y="8">Brilliant</W>
<W l="1736" t="816" r="1868" b="846" x="6" y="8">Brilliant</W>

FIG. 4 illustrates a user interface for displaying suggestions in accordance with embodiments. In FIG. 4, the user interface displays an image of a page 400, which has been extracted, recognized using OCR/ICR, and indexed using search technology. In particular, a user starts typing letters in a search box 410 for the field "Receiver" to match a term from the image of the page 400. Then, the search and analytics engine 160 provides two suggestions 422, 424 in a list box 420 for the field "Receiver". This allows the user to see type-ahead suggestions (getting the suggestions that match the typed in text from the index 170 while looking up the zone information from the boundaries file Image1.XML to associate the suggestions with zone information).

Figure 5:
FIG. 5 illustrates a user interface in response to a first suggestion being selected in accordance with certain embodiments.

Continuing with this example, the user selects the first suggestion 422 in FIG. 4. FIG. 5 illustrates a user interface in response to a first suggestion being selected in accordance with certain embodiments. As the user selects (e.g., highlights or otherwise selects) the first suggestion 422, the search and analytics engine 160 marks (e.g., draws attention to) the selected occurrence of the first suggestion 422 in the image of the page 400. In certain embodiments, the search and analytics engine 160 identifies the first suggestion 422 in the image of the page 400 (e.g., automatically draws a box 500 (i.e., a zone highlight box) around the occurrence of the first suggestion 422 in the image of the page 400) to easily notify the user where that text is in the image of the page 400.

Thus, when the first suggestion 422 is selected, the search and analytics engine 160 identifies the specific term of that selected first suggestion 422 from the image of the page 400 with a highlight (e.g., a box or other type of highlight). As the user goes down the list to select the next suggestion 424, the search and analytics engine 160 identifies the term for that selected next suggestion by moving the highlight to the specific text location of that selected next suggestion.

FIG. 6 illustrates a user interface in response to a second suggestion being selected in accordance with certain embodiments. In FIG. 6, as the user selects the second suggestion 424, the search and analytics engine 160 draws attention to the selected occurrence of the second suggestion 424 in the image of the page 400. In certain embodiments, the search and analytics engine 160 automatically draws a box 600 around the occurrence of the second suggestion 424 in the image of the page 400 to easily notify the user where that text is in the image of the page 400.

Finally, as the user selects a suggestion as the field value to be registered, the user interface 120 registers the zones of that specific value from that type of invoice so from there on that specific zone of that document type is identified as the value of that field.

FIG. 7 illustrates a user interface in response to a suggestion being selected for mapping in accordance with certain embodiments. In FIG. 7, as the user selects "Brilliant" 700 (which is the second suggestion 424) to register and map that zone to the "Receiver" field, the user interface 120 saves the selection in the configuration file 130 to map the "Receiver" field to that zone (<W l="1736" t="816" r="1868" b="846" x="6" y="8">Brilliant</W>) for any future processing of images/pages that are of the same type (e.g., a type may indicate that the document is an insurance document, a medical document, etc.).

Similarly, embodiments extend the same concept to multiple terms to be able to provide suggestions for multiple terms from the index 170 and extract their zones from the boundaries file Image1.XML for mapping and registering the multiple terms to a field. As the zones of the text information of multiple terms are extracted, embodiments may provide a weight based on associations between the multiple terms (e.g., based on whether the multiple terms on the same line of the boundaries file Image1.XML or consecutive/adjacent to each other (especially if they are consecutive terms in the search query)). The following is an example multiple term query and response:

Query: any term starting with "Brilliant Re" and matching the doc id: Image1.txt Response: Brilliant Repair Then, the search and analytics engine 160 uses the response "Brilliant Repair" as input to look up the respective zone positions from the boundaries file Image1.XML, which will result in narrowing down to two occurrences in the document with positions of:

Lookup1:
<W l="463" t="816" r="597" b="846" x="2" y="8">Brilliant</W>
<W l="612" t="816" r="732" b="853" x="3" y="8">Repair</W>
Lookup2:
<W l="1736" t="816" r="1868" b="846" x="6" y="8">Brilliant</W>
<W l="1883" t="816" r="2003" b="853" x="7" y="8">Repair</W>

With the multiple terms, embodiments do some additional processing to merge positions of the two terms to define the boundaries of the overall "Brilliant Repair" terms. Based on the boundaries file Image1.XML, the search and analytics engine 160 knows that these two terms ("Brilliant Repair") are in the same line and consecutive to each other. So, the search and analytics engine 160 takes the left and top position of the first term followed by the right and bottom position of the last term to deduce the overall zone of "brilliant repair" to be:

Consolidated Lookup:
<W l="463" t="816" r="732" b="853"> Brilliant Repair</W>
<W l="1736" t="816" r="2003" b="853">Brilliant Repair</W>

Then, embodiments follow the same technique as described in a single term approach to let the user select the text, map the zone of that text to a field, and to draw and register the zones dynamically.

In certain embodiments, the search and analytics engine 160 integrates search technology with unstructured analytics annotation and processing as part of the text extraction and recognition. After generating an index 170 related to a batch of scanned documents or images, embodiments build and define custom annotators as part of the pipeline that is invoked right after the scanning and profiling of a document. For example, fields are defined for a document of: "Receiver Phone No.", "Receiver State", and "Receiver City". Then, the search and analytics engine 160 defines a custom annotator to analyze and extract the phone number (for the "Receiver Phone No." field), state (for the "Receiver State" field), and city (for the "Receiver City" field) from the index 170. The annotator is associated with the file capture and extraction engine processing pipeline, after the profiling, and the annotator is run against the index 170 to capture the data that falls into the pattern of the phone number and state annotators.

FIG. 8 illustrates a user interface with a first selection of a receiver state, a receiver city, and a receiver phone number in accordance with certain embodiments. A user may select the state field from a list box 800 filled with the states extracted from the annotators run against the image of a page 400. A user may select the city field from a list box 810 filled with the cities extracted from the annotators run against the image of a page 400. A user may select the phone number field from a list box 820 filled with the phone numbers extracted from the annotators run against the image of a page 400.

In FIG. 8, as the user starts typing a value for a state in the list box or focuses on the item, the user interface 120 sends a query to the search and analytics engine 160 to get back the available values of the state field mentioned in the image of a page 400. With embodiments, focus may be described as hovering on a suggestion shown in the list box, and, as the user hovers on a suggestion, the user sees it as highlighted with a focus background. The search and analytics engine 160 performs additional processing to look up the zone/ position details from the boundaries file to provide suggestions to the user. Then, as the user selects a specific value from the suggestions, the search and analytics engine 160 draws a box around the zone to point it out easily on the image of a page 400. In FIG. 8, boxes are drawn around city "Salt Lake City" 802, state "UT" 804, and phone number "(801) 555-1234" 806.

With embodiments, as the user selects a specific value for the field, the search and analytics engine 160 extracts the zone information and draws a zone on the image of a page 400. The user interface 120 registers the zone for future use in the configuration file 120.

With embodiments, the query sent to the index is a facet like query requesting a list of all states OR cities OR phone numbers found in a specific document. With embodiments, facet may be described as a concept within search technology to access information in an organized way. The results are narrowed down based on matching the doc id:Image1.txt, which will respond back with following results:

For State: NV, UT
For Receiver City: Carson City, Salt lake city
For Phone Number: (801) 555-1234, (775) 555-6789

The search and analytics engine 160 looks up the zone in the boundaries file to identify the positions or boundaries of the identified text/terms.

For example, looking at the "state" field, the search and analytics engine 160 looks up "NV" in the boundaries file Image1.XML to find 2 instances of its references:
  W  l="702"  t="932"  r="757"  b="962"  x="3" y="10">NV</W>
  W  l="1972"  t="932"  r="2027"  b="962"  x="8" y="10">NV</W>

Then, the search and analytics engine 160 looks up "UT" in the boundaries file Image1.XML to find one instance:
  W  l="505"  t="655"  r="557"  b="685"  x="4" y="4">UT</W>

This results in the following list of options to the end user for the "state" field.
  NV<702,932,757,962>
  NV<1972, 932,2027,962>
  UT<505,655,557,685>

Similarly, the search and analytics engine 160 extends this concept to the city field and phone numbers field. However, the city and phone number values are multiple term span, so the search and analytics engine 160 follows the approach of identifying the separate positions of each term and spans them across multiple terms to merge them to get the overall term boundary to be able draw a zone.

FIG. 9 illustrates a user interface with a second selection of a receiver state, a receiver city, and a receiver phone number in accordance with certain embodiments. In FIG. 9, boxes are drawn around city "Carson City" 902, state "NV" 904, and phone number "(775) 555-6789" 906.

In FIGS. 8 and 9, the search box above the list box may say none (to represent that a suggestion in the list box has not been selected yet) or may be left empty with a list of suggestions in the list box. That is, unlike the type ahead suggestions where the user enters some characters to come up with suggestions that match those characters, with the annotator capability, without the user entering characters, the annotator and pattern matching pre-populate the list boxes of the fields with the suggestions matching the field type.

FIG. 10 illustrates a user interface with a second selection of a receiver state, a receiver city, and a receiver phone number and with zone mapping in accordance with certain embodiments. In FIG. 10, the fields are shown with selections of Receiver State "NV" 1000, Receiver City "Carson City" 1010, and Receiver Phone Number "(775) 555-6789" 1020. As the user selects a value from the suggestion list for each field, the specific zone related to that field is identified by a highlight (e.g., shown within a box) and then saved into the configuration file to register the mapping of the field to that specific zone. In future, when any documents of the same type as the image of the page 400 are processed, the field to zone mapping is used to extract values that are assigned to the field.

Merely to enhance understanding, another example is provided herein, but embodiments are not intended to be limited to such examples. In this example, natural language processing of analytics is used to better analyze, extract and associate terms to the fields dynamically. With this example, consider an insurance adjustor preparing or submitting a report of the latest auto accident incident in a form which has structured information, such as a claim number, a date of incident, parties involved, etc. In addition, the report may include comments as free written text in a discussion or detailed report/notes section. FIG. 11 illustrates an example notes portion 1100 of a report in accordance with certain embodiments. For this example, the following fields are defined: claimant name, claimant spouse name, claimant car color, claimant car make, damage expenses, and company handling the repairs. With embodiments, the natural language processing is used to analyze the unstructured text and build relationships to map the insights or extracted text to the defined fields. Basically, using language semantics, embodiments build the relations to identify the insights and henceforth assign them to the defined fields.

Figure 12:
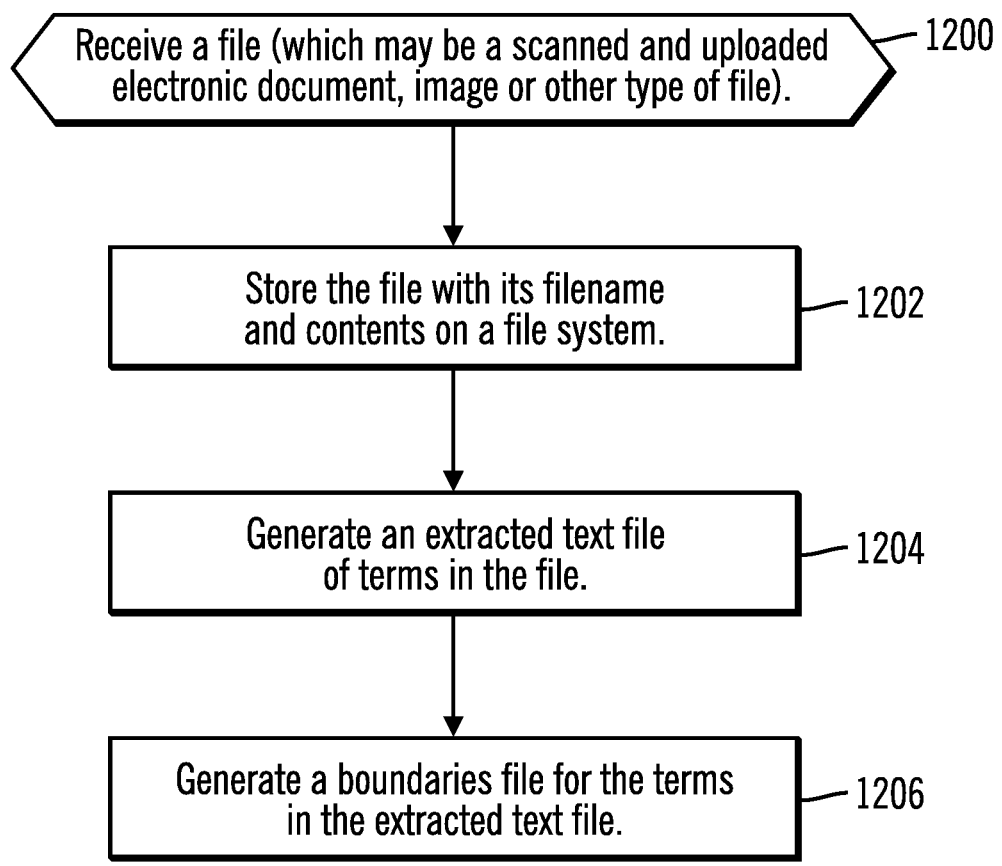
FIG. 12 illustrates, in a flowchart, operations for generating an extracted text file and a boundaries file in accordance with certain embodiments.

FIG. 12 illustrates, in a flowchart, operations for generating an extracted text file and a boundaries file in accordance with certain embodiments. Control begins at block 1200 with the file capture and extraction engine 102 receiving a file (which may be a scanned and uploaded electronic file, image or other type of file). In block 1202, the file capture and extraction engine 102 stores the file with its filename and contents on the file system. In block 1204, the file capture and extraction engine 102 generates an extracted text file of terms in the file. In block 1206, the file capture and extraction engine 102 generates a boundaries file for the terms in the extracted text file.

Figure 13A:
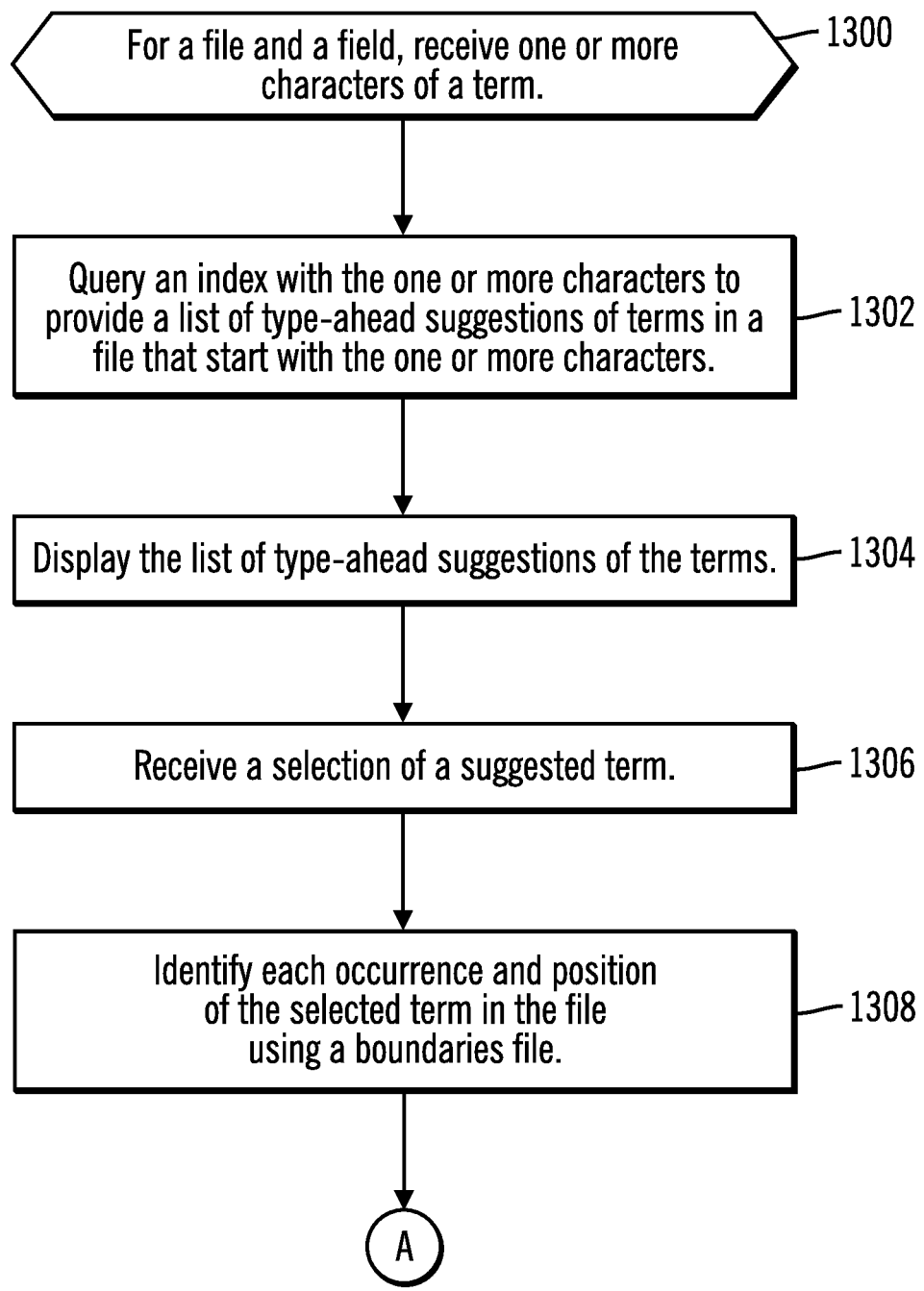
FIGS. 13A and 13B illustrate, in a flowchart, operations for mapping a zone in accordance with certain embodiments.
Figure 13B:
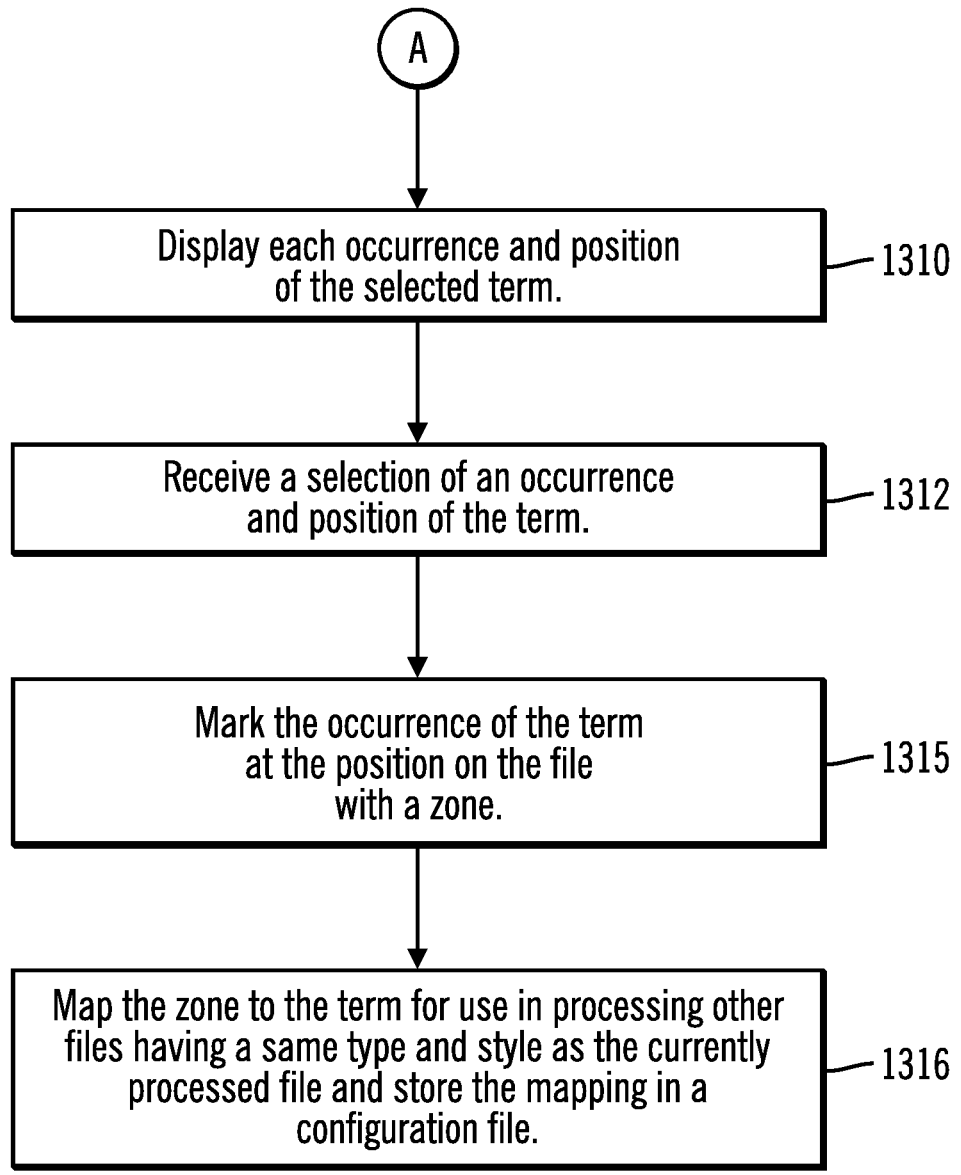

FIGS. 13A and 13B illustrate, in a flow chart, operations for mapping a zone in accordance with certain embodiments. Control begins at block 1300, for a file and a field, with the user interface 120 user interface 120 receiving one or more characters of a term. In block 1302, the user interface 120 user interface 120 issues a query to the search and analytics engine 160, and the search and analytics engine 160 queries an index with the one or more characters to provide (to the user interface 120 user interface 120) a list of type-ahead suggestions of terms in a file that start with the one or more characters. In block 1304, the user interface 120 displays the list of type-ahead suggestions of the terms. In block 1306, the user interface 120 receives selection of a suggested term and routes this to the search and analytics engine 160. In block 1308, the search and analytics engine 160 identifies each occurrence and position of the selected term in the file using a boundaries file and routes this to the user interface 120. From block 1308 (FIG. 13A), processing continues to block 1310 (FIG. 13B).

In block 1310, the user interface 120 displays each occurrence and position of the selected term. In block 1312, the user interface 120 receives a selection of an occurrence and position of the term. In block 1314, the user interface 120 marks the occurrence of the term at the position on the file with a zone. In block 1316, the user interface 120 maps the zone to the term for use in processing other files having a same type and/or style as the currently processed file and stores the mapping in a configuration file. In certain embodiments, this associates the selected term and the position with the field for any other files that match a type and/or a style of the file. With embodiments, if the type indicates "insurance", then the style may indicate for a particular company or for a particular type of insurance (e.g., home, car, etc.).

Figure 14:
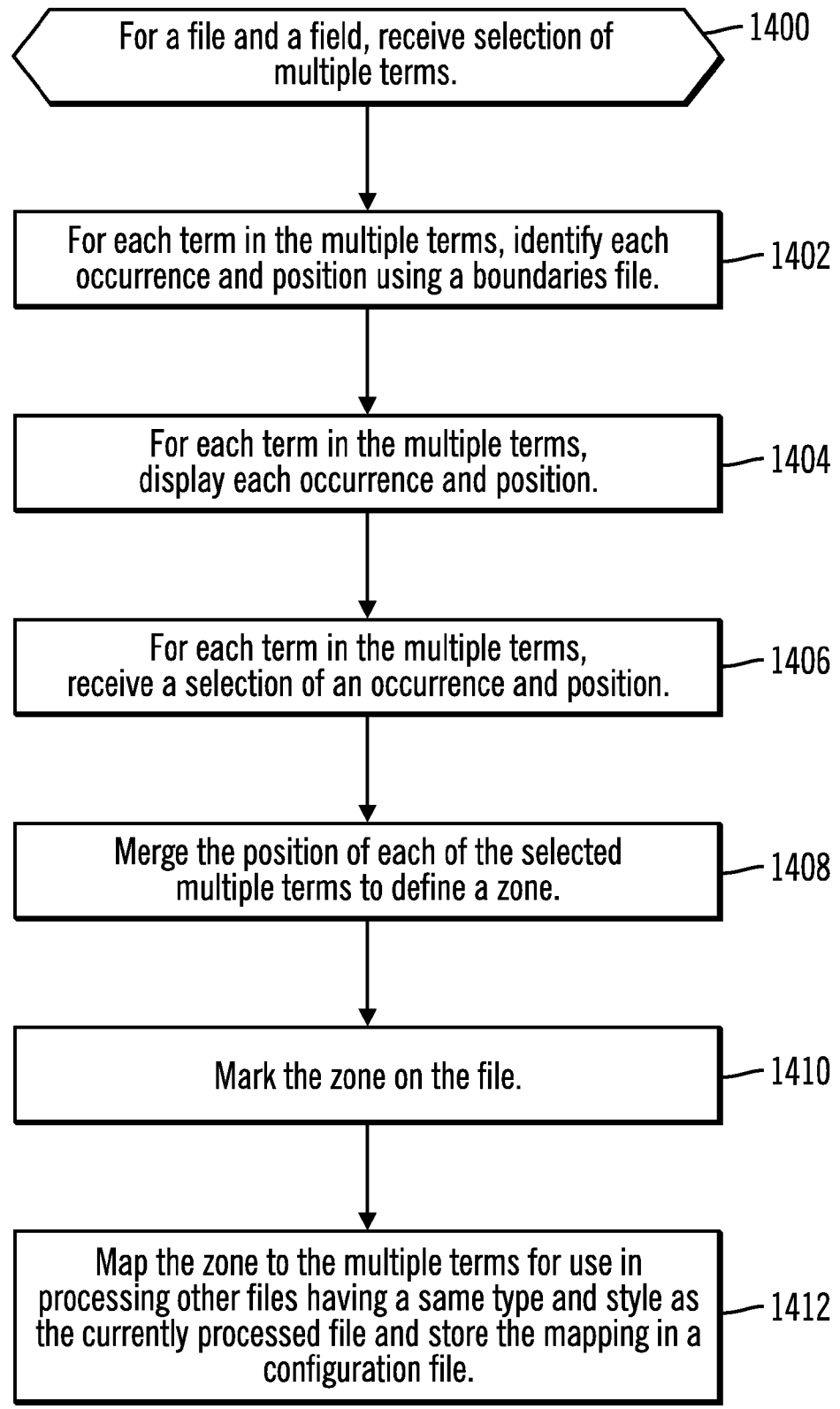
FIG. 14 illustrates, in a flowchart, operations for mapping a zone for multiple terms in accordance with certain embodiments.

FIG. 14 illustrates, in a flowchart, operations for mapping a zone for multiple terms in accordance with certain embodiments. Control begins at block 1400 with user interface 120 receiving selection of multiple terms and routing this to the search and analytics engine 160. In block 1402, for each term in the multiple terms, the search and analytics engine 160 identifies each occurrence and position using a boundaries file and routes this to the user interface 120. In block 1404, for each term in the multiple terms, the user interface 120 displays each occurrence and position. In block 1406, for each term in the multiple terms, the user interface 120 receives a selection of an occurrence and position and routes this to the search and analytics engine 160. In block 1408, the search and analytics engine 160 merges the position of each of the selected multiple terms to define a zone and routes this to the user interface 120. In block 1410, the user interface 120 marks the zone on the file. In block 1412, the user interface 120 maps the zone to the multiple terms for use in processing other files having a same type and/or style as the currently processed file and stores the mapping in a configuration file. In certain embodiments, this associates the multiple terms and the positions with the field for any other files that match a type and/or a style of the file. With embodiments, if the type indicates "insurance", then the style may indicate for a particular company or for a particular type (e.g., home, car, etc.).

Figure 15:
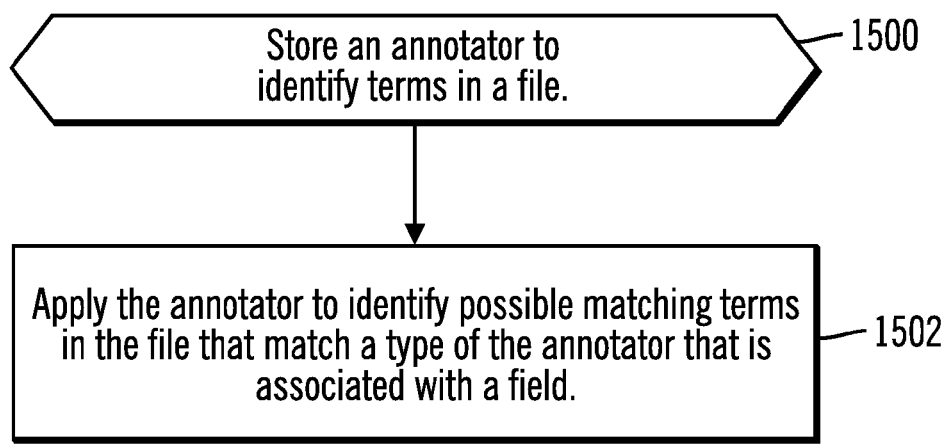
FIG. 15 illustrates, in a flowchart, operations for using an annotator in accordance with certain embodiments.

FIG. 15 illustrates, in a flowchart, operations for using an annotator in accordance with certain embodiments. In block 1500, the search and analytics engine 160 stores an annotator to identify terms in a file. In block 1502, the search and analytics engine 160 applies the annotator to identify possible matching terms in the file that match a type of the annotator that is associated with a field.

For example, there are different types of annotators that are available from the search and analytics engine 160, with capability to build custom annotators. Depending on the fields the user defines for their files, the user may indicate that particular annotators that extract specific data (e.g., cities, addresses, states, etc.) are to be applied to those fields.

Embodiments solve the manual and tedious operations of zone creation and enables the user to type in few terms of text from a specific page that is to be mapped to a field. Then, embodiments provide a list of available terms on the page that match the typed in terms. The user may select a value from that list to dynamically map the zone to that specific field.

Embodiments integrate file capture and processing with search and analytics technologies to incorporate search/analytics capabilities at the file capture level for better and efficient data processing and handling.

Embodiments dynamically map or associate zones and terms within a document image with data fields through search analytics. Embodiments extract the terms and co-ordinates of those terms from a document image and store the terms and coordinates into an index to associate a specific term and zone within the document image with its specific data field. Embodiments utilize type-ahead suggestions for the data field to retrieve possible terms for the text characters (from the type-ahead text) by searching the index.

Embodiments determine co-ordinates of selected terms in the document image and mark the document image to identify the selected terms and associate the selected terms and the co-ordinates with the data field for other documents image of a same type.

Embodiments use pattern/term extraction annotators to run against the index build from the OCR extracted data of an image or document. That is, embodiments take the OCR extracted text of the image or document and apply annotators to build an index that is used for querying certain data (such as dates, currency, names, organizations, etc.) and associate the data to specific fields.

Embodiments enable selection of a starting word of a zone, but sometimes zones are not simply defined by one or a few consecutive words. Thus, embodiments may be used to define a zone by selecting a start word (or start phrase) for a top-left corner plus an end word (or end phrase) for choosing the bottom-right corner.

Figure 16:
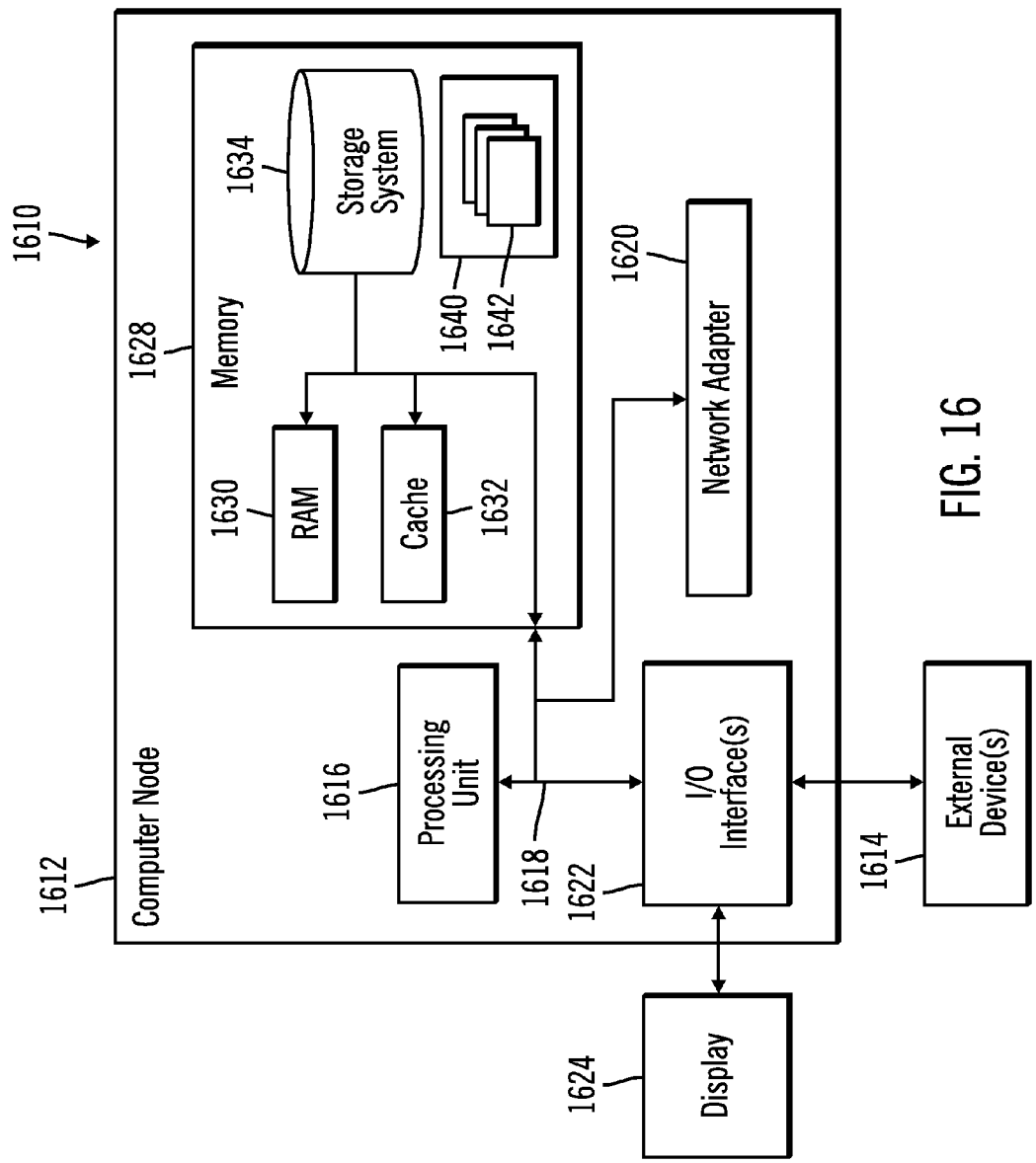
FIG. 16 illustrates a computing node in accordance with certain embodiments.

Referring now to FIG. 16, a schematic of an example of a computing node is shown. Computing node 1610 is only one example of a suitable computing node and is not intended to suggest any limitation as to the scope of use or functionality of embodiments of the invention described herein. Regardless, computing node 1610 is capable of being implemented and/or performing any of the functionality set forth hereinabove.

In computing node 1610 there is a computer system/server 1612, which is operational with numerous other general purpose or special purpose computing system environments or configurations. Examples of well-known computing systems, environments, and/or configurations that may be suitable for use with computer system/server 1612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 1612 in computing node 1610 is shown in the form of a general-purpose computing device. The components of computer system/server 1612 may include, but are not limited to, one or more processors or processing units 1616, a system memory 1628, and a bus 1618 that couples various system components including system memory 1628 to processor 1616.

Bus 1618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1612 typically includes a variety of computer system readable media. Such media may be any available media that is accessible by computer system/server 1612, and it includes both volatile and non-volatile media, removable and non-removable media.

System memory 1628 can include computer system readable media in the form of volatile memory, such as random access memory (RAM) 1630 and/or cache memory 1632. Computer system/server 1612 may further include other removable/non-removable, volatile/non-volatile computer system storage media. By way of example only, storage system 1634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1618 by one or more data media interfaces. As will be further depicted and described below, memory 1628 may include at least one program product having a set (e.g., at least one) of program modules that are configured to carry out the functions of embodiments of the invention.

Program/utility 1640, having a set (at least one) of program modules 1642, may be stored in memory 1628 by way of example, and not limitation, as well as an operating system, one or more application programs, other program modules, and program data. Each of the operating system, one or more application programs, other program modules, and program data or some combination thereof, may include an implementation of a networking environment. Program modules 1642 generally carry out the functions and/or methodologies of embodiments of the invention as described herein.

Computer system/server 1612 may also communicate with one or more external devices 1614 such as a keyboard, a pointing device, a display 1624, etc.; one or more devices that enable a user to interact with computer system/server 1612; and/or any devices (e.g., network card, modem, etc.) that enable computer system/server 1612 to communicate with one or more other computing devices. Such communication can occur via Input/Output (I/O) interfaces 1622. Still yet, computer system/server 1612 can communicate with one or more networks such as a local area network (LAN), a general wide area network (WAN), and/or a public network (e.g., the Internet) via network adapter 1620. As depicted, network adapter 1620 communicates with the other components of computer system/server 1612 via bus 1618. It should be understood that although not shown, other hardware and/or software components could be used in conjunction with computer system/server 1612. Examples, include, but are not limited to: microcode, device drivers, redundant processing units, external disk drive arrays, RAID systems, tape drives, and data archival storage systems, etc.

In certain embodiments, the client computer 100 and/or the server computer 150 has the architecture of computing node 1610. In certain embodiments, the client computer 100 and/or the server computer 150 is part of a cloud environment. In certain alternative embodiments, the client computer 100 and/or the server computer 150 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 17:
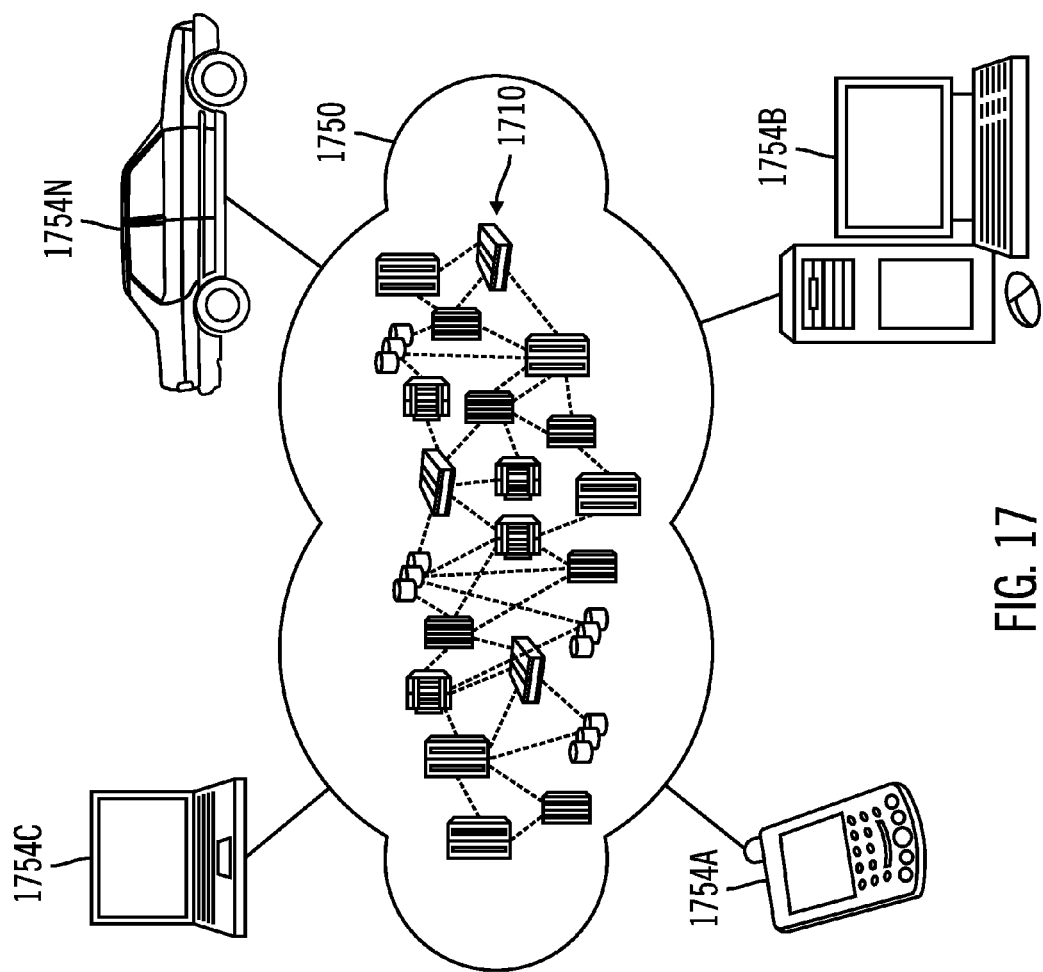
FIG. 17 illustrates a cloud computing environment in accordance with certain embodiments.

Referring now to FIG. 17, illustrative cloud computing environment 1750 is depicted. As shown, cloud computing environment 1750 comprises one or more cloud computing nodes 1710 with which local computing devices used by cloud consumers, such as, for example, personal digital assistant (PDA) or cellular telephone 1754A, desktop computer 1754B, laptop computer 1754C, and/or automobile computer system 1754N may communicate. Nodes 1710 may communicate with one another. They may be grouped (not shown) physically or virtually, in one or more networks, such as Private, Community, Public, or Hybrid clouds as described hereinabove, or a combination thereof. This allows cloud computing environment 1750 to offer infrastructure, platforms and/or software as services for which a cloud consumer does not need to maintain resources on a local computing device. It is understood that the types of computing devices 1754A-N shown in FIG. 17 are intended to be illustrative only and that computing nodes 1710 and cloud computing environment 1750 can communicate with any type of computerized device over any type of network and/or network addressable connection (e.g., using a web browser).

Figure 18:
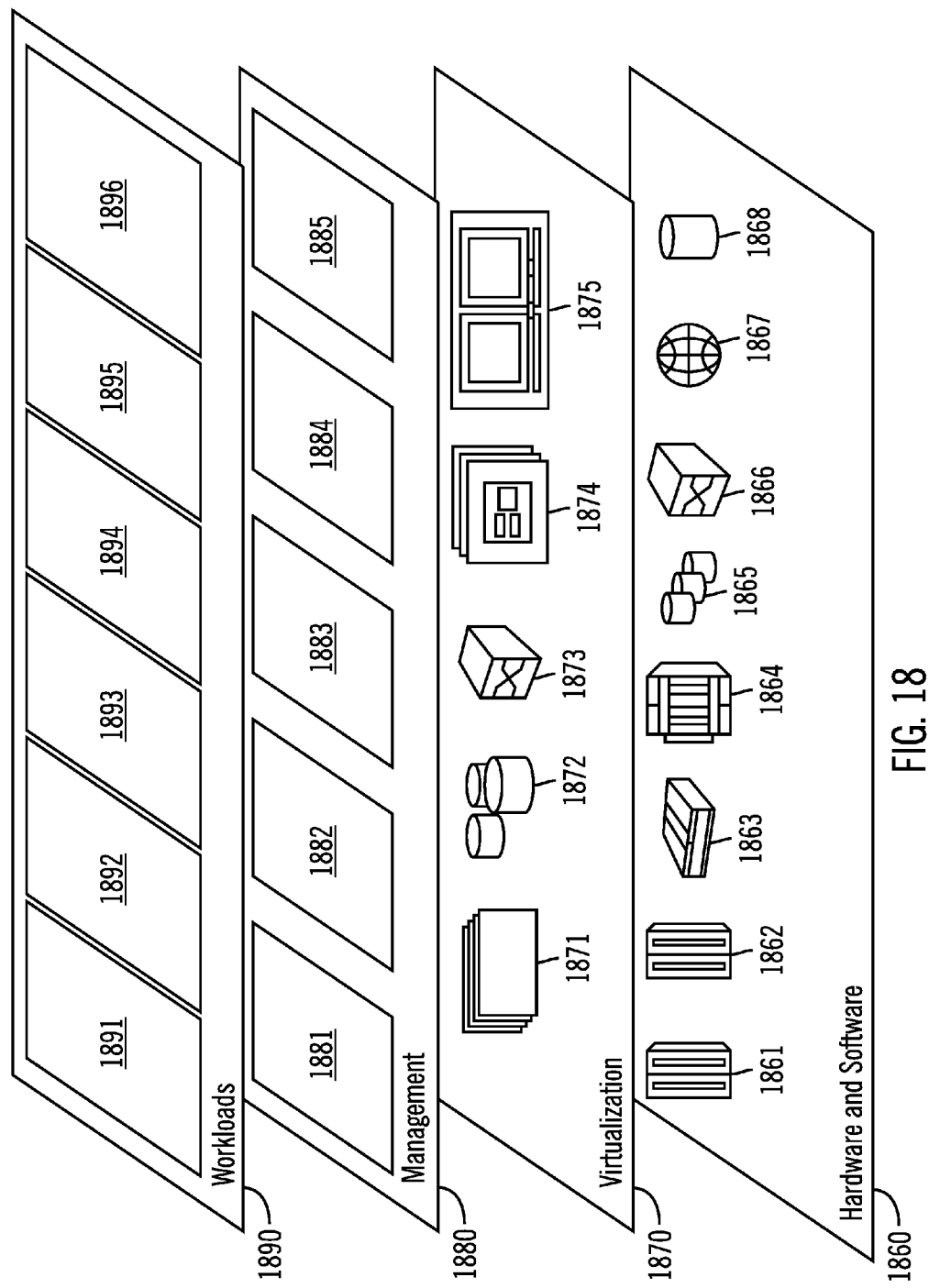
FIG. 18 illustrates abstraction model layers in accordance with certain embodiments.

Referring now to FIG. 18, a set of functional abstraction layers provided by cloud computing environment 1750 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 1860 includes hardware and software components. Examples of hardware components include: mainframes 1861; RISC (Reduced Instruction Set Computer) architecture based servers 1862; servers 1863; blade servers 1864; storage devices 1865; and networks and networking components 1866. In some embodiments, software components include network application server software 1867 and database software 1868.

Virtualization layer 1870 provides an abstraction layer from which the following examples of virtual entities may be provided: virtual servers 1871; virtual storage 1872; virtual networks 1873, including virtual private networks; virtual applications and operating systems 1874; and virtual clients 1875.

In one example, management layer 1880 may provide the functions described below. Resource provisioning 1881 provides dynamic procurement of computing resources and other resources that are utilized to perform tasks within the cloud computing environment. Metering and Pricing 1882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1883 provides access to the cloud computing environment for consumers and system administrators. Service level management 1884 provides cloud computing resource allocation and management such that required service levels are met. Service Level Agreement (SLA) planning and fulfillment 1885 provide pre-arrangement for, and procurement of, cloud computing resources for which a future requirement is anticipated in accordance with an SLA.

Workloads layer 1890 provides examples of functionality for which the cloud computing environment may be utilized.

Examples of workloads and functions which may be provided from this layer include: mapping and navigation 1891; software development and lifecycle management 1892; virtual classroom education delivery 1893; data analytics processing 1894; transaction processing 1895; and dynamic zone mapping 1896.

Thus, in certain embodiments, software or a program, implementing dynamic zone mapping in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   displaying, with a processor of a computer, a file and a search box;
   for the file and a field, while receiving text characters in the search box that form a beginning of a term, providing possible terms in the file for the text characters by querying an index; and
   in response to receiving selection of a possible term from the possible terms,
      determining each occurrence and position of the selected term in the file using a boundaries file;
      in response to selection of an occurrence and position of the selected term, marking the file to identify the selected occurrence at the position in the file by drawing a box around the selected term; and
      associating the selected term and the position with the field for any other files that match a type of the file.

2. The method of claim 1, further comprising:
   extracting the terms and coordinates of the terms from the file; and
   storing the terms into the index.

3. The method of claim 1, wherein the file is in an image format.

4. The method of claim 1, wherein multiple terms are selected, and further comprising:
   determining each occurrence and position of the multiple terms in the file; and
   in response to selection of an occurrence and position of the selected multiple terms,
      merging positions of each of the multiple terms to define a new zone; and
      marking the new zone on the file.

5. The method of claim 1, further comprising:
   storing an annotator to identify terms in the file; and
   in response to storing the terms into the index,
      applying the annotator to identify possible matching terms in the file that match a type of the annotator that is associated with another field.

6. The method of claim 1, wherein a Software as a Service (SaaS) is configured to perform method operations.

7. A computer program product, the computer program product comprising a non-transitory computer readable storage medium having program code embodied therewith, the program code executable by at least one processor to perform:
   displaying a file and a search box;
   for the file and a field, while receiving text characters in the search box that form a beginning of a term, providing possible terms in the file for the text characters by querying an index; and
   in response to receiving selection of a possible term from the possible terms,
      determining each occurrence and position of the selected term in the file using a boundaries file;
      in response to selection of an occurrence and position of the selected term, marking the file to identify the selected occurrence at the position in the file by drawing a box around the selected term; and
      associating the selected term and the position with the field for any other files that match a type of the file.

8. The computer program product of claim 7, wherein the program code is executable by the at least one processor to perform:
   extracting the terms and coordinates of the terms from the file; and
   storing the terms into the index.

9. The computer program product of claim 7, wherein the file is in an image format.

10. The computer program product of claim 7, wherein multiple terms are selected, and wherein the program code is executable by the at least one processor to perform:
    determining each occurrence and position of the multiple terms in the file; and
    in response to selection of an occurrence and position of the selected multiple terms,
       merging positions of each of the multiple terms to define a new zone; and
       marking the new zone on the file.

11. The computer program product of claim 7, wherein the program code is executable by the at least one processor to perform:
    storing an annotator to identify terms in the file; and
    in response to storing the terms into the index,
       applying the annotator to identify possible matching terms in the file that match a type of the annotator that is associated with another field.

12. The computer program product of claim 7, wherein a Software as a Service (SaaS) is configured to perform computer program product operations.

13. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations of:
    displaying a file and a search box;
    for the file and a field, while receiving text characters in the search box that form a beginning of a term, providing possible terms in the file for the text characters by querying an index; and
    in response to receiving selection of a possible term from the possible terms,
       determining each occurrence and position of the selected term in the file using a boundaries file;
       in response to selection of an occurrence and position of the selected term, marking the file to identify the selected occurrence at the position in the file by drawing a box around the selected term; and
       associating the selected term and the position with the field for any other files that match a type of the file.

14. The computer system of claim 13, wherein the operations further comprise:
    extracting the terms and coordinates of the terms from the file; and
    storing the terms into the index.

15. The computer system of claim 13, wherein the file is in an image format.

16. The computer system of claim 13, wherein multiple terms are selected, and wherein the operations further comprise:
    determining each occurrence and position of the multiple terms in the file; and
    in response to selection of an occurrence and position of the selected multiple terms, merging positions of each of the multiple terms to define a new zone; and marking the new zone on the file.

17. The computer system of claim 13, wherein the operations further comprise:

storing an annotator to identify terms in the file; and in response to storing the terms into the index, applying the annotator to identify possible matching terms in the file that match a type of the annotator that is associated with another field.

18. The computer system of claim 13, wherein a Software as a Service (SaaS) is configured to perform system operations.

\* \* \* \* \*